Patented Sept. 2, 1952

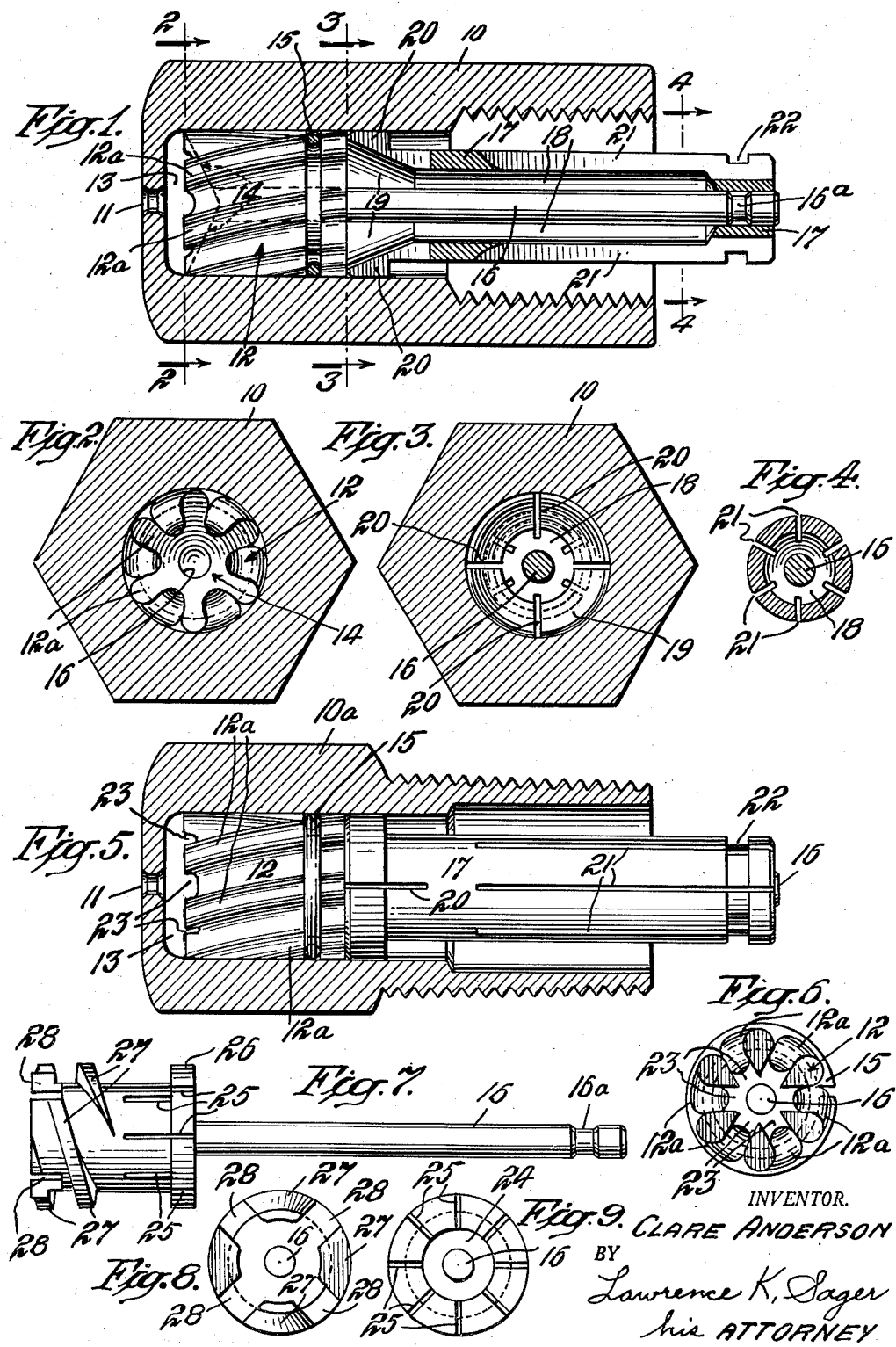

2,609,238

UNITED STATES PATENT OFFICE 2,609,238

SPRAYER NOZZLE

Clare Anderson, Kinnelon, N. J.

Application February 21, 1950, Serial No. 145,459

2 Claims. (Cl. 299—120)

This invention relates to nozzles for spraying under pressure various liquids, such as powdery gaseous, abrasive, chemical, emulsive, coloring and any form of viscous compounds of various viscosities.

This improvement relates to nozzles which operate on the principle of twirling the liquid prior to being expelled from the orifice of the nozzle and at an initial radius greater than that of the discharge orifice. More particularly it relates to an improved form of nozzle which will produce a spray in the form of a solid cone substantially uniform in the distribution of the spray particles over the area covered by the conical discharge.

One object is to produce a conical discharge area having a wide angle to produce a substantially uniform distribution of the spray particles over the area covered by the discharge, essentially independent of the character of the liquid used, or its viscosity or temperature, exerted pressure, or surface tensions, internal frictions, etc. of the liquids. This is accomplished by discharging the twirl streams tangentially to the orifice periphery and by providing means to retard a portion of the twirling liquid before being discharged from the orifice.

Another object is to provide a simple form of structure for retaining the twirl member in place within its housing and permit convenient removal and replacement without the use of screw threaded parts or auxiliary holding members. Another object is to provide a liquid strainer of simple form which may be readily removed, cleaned and replaced without the use of screw threaded parts or auxiliary holding members. These and other objects and advantages of this improvement will be understood from the following description and accompanying drawing which shows preferred forms.

Fig. 1 is a longitudinal mid-section of one embodiment; Fig. 2 is a cross section on the line 2—2 of Fig. 1; Fig. 3 is a cross section on the line 3—3 of Fig. 1; Fig. 4 is a cross section on the line 4—4 of Fig. 1; Fig. 5 is a longitudinal mid-section of another embodiment; Fig. 6 is an end view of the innermost end of the twirl member of the form shown in Fig. 5; Fig. 7 is a side view of another form of twirl member; Fig. 8 is an end view of the left-hand end of the form of Fig. 7; and Fig. 9 is an end view looking from the right of Fig. 7.

Referring to Figs. 1 to 4, the main housing or body 10 is shown having a hexagonal exterior form as shown in Figs. 2 and 3. This housing is hollow and is closed at one end except for the central discharge orifice 11 as shown in Fig. 1. The opposite end portion is interiorly threaded for screwing onto an exteriorly threaded stem or pipe from which fluid is delivered to the nozzle under pressure. Within the left-hand end of the housing is located the twirl member 12 provided with exterior ribs 12a which extend in a direction helically inclined to the axis of the nozzle; and within the helically inclined passages between these ribs the liquid passes and imposes a rotary or twirling action upon the liquid as it passes therefrom into the space 13 between the discharge end of the twirl member and the end of the housing. The discharge end of the twirl member is cut away to provide a conical cavity within the apex of the cone coinciding with the axis of the device and with its sides diverging to the circumference of the discharge end of the twirl member as shown by the dotted lines 14 in Fig. 1. Near the opposite end of the twirl member is a circumferential slot in which is located an expansible ring or wire 15 of good resilient material, such as beryllium copper wire. This wire ring has a small portion of it cut away to permit it to be compressed within its slot on the twirl member and thereby exerts pressure on the interior wall of the housing for holding the twirl member in fixed position when assembled in place. The twirl member has a small central opening in which is secured by a driving fit one end of a rod 16 of brass or other suitable material. This rod extends out beyond the open end of the housing and is provided near its outer end with a circumferential slot 16a for the purpose of conveniently withdrawing the twirl member from within the housing against the pressure of the retaining ring 15. In this manner the twirl member may be readily inserted in the position shown in Fig. 1 and easily withdrawn for cleaning without the use of threaded parts.

A strainer 17 is provided for separating any particles from the liquid before the liquid passes to the twirl member. This strainer is of hollow, cylindrical form and surrounds the rod 16 with a cylindrical space 18 between the rod and the interior of the strainer. At the inner end of the strainer is a cone-shaped cavity 19 which connects with the space 18 and flares outwardly therefrom to cover the receiving end of the twirl member. The inner end of the strainer is enlarged to engage the inner wall of the housing and this end portion is provided with a series of short longitudinal slots 20 spaced circumferentially from each other as particularly shown in Fig. 3. The enlarged rim of the strainer is adapted to fit tightly against the inner wall of the housing and the slots 20 serve to permit the inner end of the strainer to be compressed slightly and thereby serves as a frictional clutch engagement for holding the strainer in position. The main length of the strainer which surrounds the space 18 is also provided with a series of longitudinal slots 21 spaced circumferentially from each other as particularly shown in Fig. 4. These slots permit the liquid to pass from the source under pressure to the cylindrical space 18 from which it passes within the conical cavity 19 and thence to the twirl member. The outer end of the strainer embraces the outer end of the rod 16 with a sliding fit. A circumferential slot 22 is provided near the outer end of the strainer for convenience in withdrawing it outwardly from within the housing.

In operation, the liquid passes through the slots 21 of the strainer which strains the liquid and then passes from within the strainer to the receiving end of the twirl member. It then passes through the openings between the inclined ribs 12a which may be of helical form and then enters the chamber 13 bounded by the cone 14 and the end of the housing. The liquid is delivered into this space or chamber with a rotary or twirling movement. However an important feature of this improvement is the fact that the ribs 12a project within the path of the twirling liquid by reason of their extending around the conical chamber and thereby serve to retard the velocity of portions of the liquid. This results in a portion of the liquid having a high velocity at the outer portion of the liquid in the exit chamber at a larger radius than that of the discharge orifice and results in the inner portions of the liquid having a reduced velocity. Thus when the liquid is discharged from the orifice, the portions having the higher velocity are delivered tangentially to form the outer portions of the cone, whereas the portions of the liquid having the slower movement are delivered from the orifice at lesser angles than the outer portion of the spray with the result that a substantially uniform distribution of the spray particles is obtained over the area of the conical discharge. Prolonged tests have shown that this form of spray discharge is obtained by using liquids of various types and is essentially independent of the pressures, surface tensions, viscosities, internal frictions and temperatures of the liquids.

Furthermore, the parts are quickly removable for cleaning and conveniently replaced. The removal is accomplished by the ends of one's fingers or nails engaging the slot 22 of the strainer and thereby withdrawing it, after which the twirl member is similarly removed by engagement of the slot 16a; and, as already explained, the friction ring or clutch 15 serves to hold the twirl member in place and the compressible inner end of the strainer serves to hold it in place by frictional engagement with the inner wall of the housing.

In some cases where the character of fluid requires no straining, the strainer is removed. In that case the liquid passes within the housing 10 directly to the receiving end of the twirl member over which it passes and functions in the same manner as when the strainer is used.

Figs. 5 and 6 show another embodiment of this invention similar to the form already described except the formation of the discharge end of the twirl member opposite the discharge orifice; and corresponding parts are similarly designated. In Fig. 5 the housing 10a is similar to the housing of the foregoing figures except it is externally threaded, instead of being internally threaded, for adaptation to an internally threaded outlet of the liquid source. Either form of housing may, of course, be used. In the form of Figs. 5 and 6 no conical cavity is formed in the discharge end of the twirl member opposite the discharge orifice, but that end of the twirl member is provided with a series of radially extending slots 23 displaced at an angle to each other and passing between the ends of the ribs 12a. The provision of these slots results in the ends of the ribs 12a projecting within the discharge chamber 13 and thereby serves to retard portions of the twirling liquid and thereby functions in the same manner as described with reference to Fig. 1, giving a substantially uniform distribution over the area of the conical spray discharge.

Figs. 7, 8 and 9 show another modification of the twirl member. In this case the twirl member also serves as the strainer. The rod 16 is secured to the twirl member by a driving fit within the end portion thereof, but a cylindrical space 24, as shown in Fig. 9, is provided between the rod and the intake portion of the twirl member. This portion is provided with longitudinal slots 25 spaced circumferentially from each other and also provided with an outwardly extending rim 26 for the purpose of frictionally engaging the interior wall of the housing for holding the twirl member in place. This twirl member is provided with helically inclined ribs 27 for imparting the twirling motion to the fluid as it leaves the twirl member. The face of the twirl member opposite the discharge opening is formed with radial cross cuts 28 displaced angularly from each other. This results in the ends of the spiral threads 27 extending in the path of the twirling liquid in the chamber opposite the discharge orifice; and these projections serve to retard portions of the twirling liquid, giving a substantially uniform distribution of the spray particles within the area of the conical discharge in the manner already described.

The angle of the conical discharge from the orifice in the various forms abve described may be varied by proportioning and design of the parts relatively to each other. Likewise various modifications of this improvement may be made without departing from the scope of the invention.

I claim:

1. A sprayer nozzle comprising a housing, a twirl member within the housing having one end opposite the discharge orifice and spaced from the end of the housing to provide a chamber, said twirl member having portions extending within said chamber with spaces between said portions for retarding the movement of portions of the liquid to be sprayed, a resilient ring circumferentially embracing the twirl member and engaging the interior wall of the housing for removably holding it in place, and a rod centrally secured to the twirl member and extending to the opposite end of the housing for enabling the withdrawal of the twirl member from the housing.

2. A sprayer nozzle comprising a housing, a twirl member within the housing located at the end of the housing with one end opposite the discharge orifice, a strainer of hollow cylindrical form engaging the twirl member at one end and extending to the opposite end of the housing, said strainer having slots extending in an axial direction and spaced from each other circumferentially for providing passage of the liquid from the exterior of the strainer to within it and then to the twirl member, and a rod centrally secured to the twirl member and extending axially within said strainer and spaced therefrom along its length and being in engagement with said strainer at its outer end.

CLARE ANDERSON.

REFERENCES CITED

The following references are of record in the file of this patent:

UNITED STATES PATENTS

| Number | Name | Date |
|---|---|---|
| 860,259 | Smith | July 16, 1907 |
| 1,496,924 | Day | June 10, 1924 |
| 1,794,555 | Sjoman et al. | Mar. 3, 1931 |
| 1,953,990 | Roselund | Apr. 10, 1934 |
| 2,396,449 | Wahlin | Mar. 12, 1946 |
| 2,439,257 | Lum | Apr. 6, 1948 |

FOREIGN PATENTS

| Number | Country | Date |
|---|---|---|
| 667,654 | Germany | Nov. 18, 1938 |
| 699,347 | France | Dec. 9, 1930 |